US012121947B2

(12) United States Patent
Gaydoul

(10) Patent No.: US 12,121,947 B2
(45) Date of Patent: Oct. 22, 2024

(54) DEVICE AND METHOD FOR DESCALING ROLLING STOCK

(71) Applicant: Hermetik Hydraulik AB, Djursholm (SE)

(72) Inventor: Jürgen Gaydoul, Djursholm (SE)

(73) Assignee: Hermetik Hydraulik AB, Djursholm (SE)

(*) Notice: Subject to any disclaimer, the term of this patent is extended or adjusted under 35 U.S.C. 154(b) by 697 days.

(21) Appl. No.: 17/269,760

(22) PCT Filed: Aug. 21, 2018

(86) PCT No.: PCT/EP2018/072509
§ 371 (c)(1),
(2) Date: Feb. 19, 2021

(87) PCT Pub. No.: WO2020/038558
PCT Pub. Date: Feb. 27, 2020

(65) Prior Publication Data
US 2021/0316349 A1 Oct. 14, 2021

(51) Int. Cl.
*B05B 7/08* (2006.01)
*B05B 13/04* (2006.01)
*B08B 3/02* (2006.01)
*B21B 45/08* (2006.01)

(52) U.S. Cl.
CPC ............ *B21B 45/08* (2013.01); *B05B 7/0892* (2013.01); *B05B 13/0484* (2013.01); *B08B 3/022* (2013.01)

(58) Field of Classification Search
None
See application file for complete search history.

(56) References Cited

U.S. PATENT DOCUMENTS 5,502,881 A 4/1996 Gaydoul
6,149,733 A 11/2000 Djumlja et al.
2016/0303627 A1* 10/2016 Cramer .................. B21B 45/08

FOREIGN PATENT DOCUMENTS

| | | | |
|---|---|---|---|
| CN | 1925934 | A | 3/2007 |
| CN | 201150957 | Y | 11/2008 |
| CN | 201913013 | U | 9/2011 |
| CN | 102395446 | A | 3/2012 |
| CN | 205732079 | U | 11/2016 |
| CN | 107520079 | A | 12/2017 |
| CN | 207721387 | U | 8/2018 |
| DE | 4328303 | A1 | 6/1994 |
| DE | 102015226657 | A1 | 6/2017 |

(Continued)

OTHER PUBLICATIONS

DE 102016217561 A1 translation, Apparatus And Method For Descaling A Moving Workpiece, Ante (Year: 2017).*

(Continued)

*Primary Examiner* — Cristi J Tate-Sims
(74) *Attorney, Agent, or Firm* — Leydig, Voit & Mayer, Ltd.

(57) ABSTRACT

A nozzle head for descaling rolling stock, said rolling stock moving relative to said nozzle head, is adapted to be mounted for rotation about an axis of rotation relative to a surface of said rolling stock. Said nozzle head comprises a plurality of nozzles adapted to spray a liquid on said rolling stock, wherein said nozzles are positioned at different radial distances from said axis of rotation.

14 Claims, 6 Drawing Sheets

(56) References Cited

FOREIGN PATENT DOCUMENTS

| | | | |
|---|---|---|---|
| DE | 102016217561 | A1 | 9/2017 |
| JP | H06-226215 | A | 8/1994 |
| JP | H07-060333 | A | 3/1995 |
| JP | 2008-080265 | A | 4/2008 |
| KR | 10-1189515 | B1 | 10/2012 |
| WO | WO 2005082555 | A1 | 9/2005 |

OTHER PUBLICATIONS

Indian Patent Office, Examination Report in Indian Patent Application No. 202137010802 (Aug. 5, 2022).

Japan Patent Office, Notice of Reason for Rejection in Japanese Patent Application No. 2021-534426 (Jul. 5, 2022).

European Patent Office, Communication from the Examining Division in European Patent Application No. 18759599.6, 7 pp. (Sep. 7, 2022).

China Patent Office, First Office Action in Chinese Patent Application No. 201880096816.5, 10 pp. (Sep. 28, 2022).

Brazilian Patent Office, Office Action in Brazilian Patent Application No. 112021002907-9 (Sep. 7, 2022).

European Patent Office, International Search Report in International Patent Application No. PCT/EP2018/072509, 4 pp. (Mar. 8, 2019).

European Patent Office, Written Opinion in International Patent Application No. PCT/EP2018/072509, 7 pp. (Mar. 8, 2019).

European Patent Office, International Preliminary Report on Patentability in International Patent Application No. PCT/EP2018/072509, 19 pp. (Oct. 30, 2020).

* cited by examiner

DEVICE AND METHOD FOR DESCALING ROLLING STOCK

CROSS-REFERENCE TO RELATED APPLICATIONS

This patent application is a U.S. national phase application of International Patent Application No. PCT/EP2018/072509, filed on Aug. 21, 2018, the disclosure of which is incorporated herein by reference in its entirety for all purposes.

FIELD OF THE INVENTION

The invention relates to a device and method for descaling, in particular for descaling surfaces with a liquid sprayed from a rotating nozzle head, such as in a rolling mill for producing steel strips or strips of non-ferrous metals.

BACKGROUND

Systems and methods for descaling rolling stock, such as thin rolled steel, by spraying it with high pressure water from rotating nozzles are known from the patent publications U.S. Pat. No. 5,502,881 and US 2007/0277358 A1. In the techniques described therein, the rolling stock moves past a linear array of nozzle heads that extends across a width of the rolling stock. Each of the nozzle heads in the array is mounted for rotation, and comprises a plurality of nozzles positioned along an outer circumference of the nozzle head. Each of the nozzles of the nozzle head sprays liquid, such as water under high pressure on the rolling stock, thereby removing scale that may form on the rolling stock.

FIG. 1 is a schematic top plan view of a spray pattern produced by a nozzle head according to the state of the art. The rotating nozzles each give rise to a circular spray pattern on the surface of the rolling stock 100. Given that the rolling stock 100 moves in a linear direction (indicated by the arrow F in FIG. 1) under the rotating nozzle head, the superimposed spray pattern is a spiral 102. As can be seen from FIG. 1, the spirals from the respective nozzles overlap and superimpose at the boundary regions. In the spray pattern 102, this overlap may lead to strips 104, 104' along the direction of movement F of the rolling stock 100 at the periphery of the circles.

For ease of presentation, FIG. 1 shows the spray pattern 102 of a single nozzle head only, wherein the nozzle head can be equipped with one or more nozzles. But in many applications, a plurality of spray heads may be arranged in a line or array across a width of the rolling stock 100 (perpendicular to direction F), and all these nozzle heads lead to spiral spray patterns 102 with strips 104, 104' at the boundary that are identical or very similar to those shown in FIG. 1.

In the areas of overlap indicated by the strips 104, 104', more liquid impinges under pressure on the rolling stock 100 than in surrounding areas, which may lead to unwanted non-uniformities or even descaling marks on the rolling stock 100.

There is hence a need for a device and method that allows for a more homogeneous, uniform descaling of rolling stock.

Overview of the Invention

This objective is achieved with a nozzle head for descaling rolling stock according to independent claim 1, and a method for descaling rolling stock according to independent claim 12. The dependent claims refer to preferred embodiments.

A nozzle head for descaling rolling stock according to the invention, said rolling stock moving relative to said nozzle head, is adapted to be mounted for rotation about an axis of rotation relative to a surface of said rolling stock and comprises a plurality of nozzles adapted to spray a liquid on said rolling stock, wherein said nozzles are positioned at different radial distances from said axis of rotation.

Moving said nozzles away from the outer periphery of the rotating nozzle head may seem counter-intuitive and counterproductive to one skilled in the art, since it reduces the range and angular momentum of the emitted liquid. However, it is the insight of the inventor that nozzles that are positioned at different radial distances from said axis of rotation may lead to a more uniform and more homogeneous spray pattern across the rolling stock, and hence to an improved descaling result.

In particular, given that the spray pattern is more uniform, unwanted descaling marks on the rolling stock can be effectively avoided.

In addition, given that the spray pattern is more uniform, the desired descaling result can be achieved with a smaller amount of liquid intake, or liquid at lower pressure, and hence more efficiently and at lower costs.

The techniques of the present invention can be employed for hot and cold descaling of a large variety of workpieces or stock, including steel or other ferrous metals as well as non-ferrous metals such as aluminum, brass, or copper.

The techniques of the present invention may replace inferior methods of descaling for non-ferrous metals, such as chemical descaling, in particular etching, or descaling by means of brushes.

The techniques according to the present invention are versatile and can be employed for materials of any shape or dimension.

A stock, in the sense of the present disclosure, may denote any object requiring descaling, including objects of varying material composition, size or shape.

For instance, a stock may comprise steel strips or strips of non-ferrous metals, such as slabs, plates or other wide steel products in hot or cold condition. Moreover, the stock may comprise blooms, bars, profiles, round steel, pipe or wires, as well as ingots and blooms from ingot mold casting.

The stock may be formed in forging mills in all kinds of shapes, including rings.

A rotation, in the sense of the present disclosure, may relate to a circular motion or an elliptical motion, or any other kind of motion in which said nozzle head turns relatively to said surface of said rolling stock.

An axis of rotation, in the sense of the present disclosure, may refer to an axis perpendicular to a plane of said rotation. Said axis of rotation may coincide with a drive axis of said nozzle head. However, this is optional, and said axis of rotation may also be an imaginary axis defined solely by said rotational movement of said nozzle head.

A rolling stock, in the sense of the present disclosure, refers to a stock that moves relative to said nozzle head. For instance, said nozzle head may be stationary, and said stock may move in a linear direction relative to said nozzle head. In other embodiments, the stock may be stationary, and said nozzle head may be moved across said rolling stock, in addition to said rotation of said nozzle head relative to said surface. In other embodiments, both the stock and the nozzle head may move relative to a stationary frame of reference.

In an embodiment, said nozzle head comprises at least a first nozzle positioned at a first radial distance from said axis of rotation, and a second nozzle positioned at a second radial distance from said axis of rotation, wherein said second distance is smaller than said first distance.

In particular, said second nozzle is positioned away from a circumferential periphery of said nozzle head.

The inventor found that positioning said second nozzle at a smaller distance from said axis of rotation may lead to a more homogeneous descaling, and may avoid descaling strips.

A radial distance between neighboring nozzles may be chosen such that the corresponding spray patterns touch each other or overlap slightly on a surface of the rolling stock. This may allow to achieve a particularly homogeneous descaling of the rolling stock.

In general, the radial distance between neighboring nozzles may depend both on a distance between the nozzle head and the surface of the rolling stock, and on a jet opening angle or spray angle of the respective nozzles.

In general, the larger the height of the nozzles above the surface of the rolling stock, and the wider the jet opening angle of the jet exiting from the nozzles, the greater the radial distance between neighboring nozzle heads can be chosen.

In a non-limiting example, said second radial distance amounts to at most 0.9 times said first radial distance, and in particular at most 0.8 times said first radial distance.

In an embodiment, said plurality of nozzles are arranged along circles or ellipses with different radii.

Said radii may be measured from said axis of rotation.

For instance, said nozzle head may comprise a first group of at least one nozzle arranged at a first radius, and a second group of at least one nozzle arranged at a second radius, wherein said second radius is smaller than said first radius.

In general, each of said first group of nozzles and/or said second group of nozzles may comprise any number of nozzles.

According to an example, the number of nozzles in the first group of nozzles and/or the number of nozzles in the second group of nozzles is at least two.

In an embodiment, a number of nozzles in said second group of nozzles may be no larger than a number of nozzles in said first group of nozzles, in particular smaller than a number of nozzles in said first group of nozzles.

Nozzles at a larger diameter will usually sweep across and descale a larger surface area 30 portion. Hence, by varying the number of nozzles with the diameter, a more homogeneous descaling over the entire surface of the rolling stock can be achieved.

In an embodiment, said second radius may be at most 0.9 times said first radius, and in particular at most 0.8 times said first radius.

The invention is not limited to nozzles arranged along two circles or ellipses, but may comprise nozzles at any number of distances from said axis of rotation.

For instance, said nozzle head may comprise a third group of at least one nozzle positioned at a third radius, wherein said third radius is smaller than said second radius.

The third group of nozzles may comprise any number of nozzles.

A number of nozzles in said third group of nozzles may be no larger than a number of nozzles in said second group of nozzles, and in particular may be smaller than a number of nozzles in said second group of nozzles.

According to an example, the number of nozzles in said third group of nozzles may be at least two.

In an embodiment, said third radius is at most 0.8 times said first radius, and in particular at most 0.7 times said first radius.

According to an embodiment, said nozzles may be radially angle inclined outwardly.

The inventor found that a radial inclination of the nozzles may enhance the range of the spray pattern, and may lead to a more homogeneous descaling.

In an embodiment, an outward inclination angle may amount to at least 10 or at least 50, and in particular at least 10°.

In an embodiment, said outward inclination angle is at most 40°, or at most 30°, or at most 20°, or at most 150 and in particular at most 10°.

Nozzles at different radial distance from said axis of rotation may have different outward inclination angles.

In an embodiment, said nozzle head comprises at least a first nozzle positioned at a first radial distance from said axis of rotation, said first nozzle being radially inclined outwardly at a first outward inclination angle, and a second nozzle positioned at a second radial distance from said axis of rotation, said second nozzle being radially inclined outwardly at a second outward inclination angle, wherein said second radial distance is smaller than said first radial distance and wherein said second outward inclination angle is different from said first outward inclination angle.

Said second outward inclination angle may be larger or smaller than said first outward inclination angle.

By varying the outward inclination angle with a radial distance of the corresponding nozzle from said axis of rotation, a more homogeneous descaling can be achieved.

In some examples, said second outward inclination angle may be zero, or essentially zero.

In these examples, only the nozzles positioned at the largest radial distance may be inclined outwardly.

Alternatively or additionally, said nozzles may be inclined in a circumferential direction of said nozzle head.

In an embodiment, said nozzles may be inclined in or along a direction of rotation of said nozzle head.

Alternatively, said nozzles may be inclined against a direction of rotation of said nozzle head.

In an example, a circumferential inclination angle may be at least 50, and in particular at least 10°. In some examples, the circumferential inclination angle may be in a range of 30 to 20°, and may be adjusted in accordance with a rotation speed of the nozzle head.

In an embodiment, a circumferential inclination angle may amount to at most 50°, and in particular at most 40° or at most 20°.

Again, a more homogeneous spray pattern can be achieved by varying the circumferential inclination angle with the radial distance of the corresponding nozzle from said axis of rotation.

In an embodiment, said nozzle head comprises at least a first nozzle positioned at a first radial distance from said axis of rotation, said first nozzle being inclined in a circumferential direction at a first circumferential inclination angle, and a second nozzle positioned at a second radial distance from said axis of rotation, said second nozzle being inclined in a circumferential direction at a second circumferential inclination angle, wherein said second radial distance is smaller than said first radial distance and wherein said second circumferential inclination angle is different from said first circumferential inclination angle.

In an example, said second circumferential inclination angle may be smaller than said first circumferential inclination angle.

Alternatively, said second circumferential inclination angle may be greater than said first circumferential inclination angle.

The uniformity of the spray pattern may also be enhanced by varying the amount of liquid sprayed from said nozzles at different radial distances, such as by varying the liquid pressure and/or varying an orifice size of said nozzles.

In an embodiment, said nozzle head comprises at least a first nozzle positioned at a first radial distance from said axis of rotation, said first nozzle having a first orifice size, and a second nozzle positioned at a second radial distance from said axis of rotation, said second nozzle having a second orifice size, wherein said second radial distance is smaller than said first radial distance, and wherein said second orifice size is different from said first orifice size, in particular smaller or larger than said first orifice size.

Said orifice size may relate to an orifice diameter.

In some embodiments, said orifices of said nozzles may have a circular cross-section. In other embodiments, a cross-section of said orifices may be elliptical. In still other embodiments, said orifices may be slit-shaped.

The invention also relates to a device for descaling rolling stock, comprising a nozzle head with some or all of the features described above, said nozzle head being mounted for rotation about said axis of rotation relative to said surface of said rolling stock.

Said device may further comprise a drive unit adapted to rotate said nozzle head about said axis of rotation.

In an embodiment, said device further comprises a supply unit adapted to supply said liquid to said nozzle head.

The invention has so far been described with reference to a single nozzle head. However, as explained in the background section, in practice descalers oftentimes comprise a plurality of nozzle heads, such as arranged in an array across a width of said rolling stock.

The present invention hence also relates to a device for descaling rolling stock, comprising a plurality of nozzle heads with some or all of the features recited above.

In an example, said nozzle heads may be arranged across a width of said rolling stock, in particular vertically and/or horizontally across a width of said rolling stock.

In some examples, said nozzle heads may be arranged in at least one row, and in particular in a plurality of staggered rows.

A staggered configuration may be particularly advantageous if nozzle heads are provided on several surface sides of said rolling stock, so as to prevent the ejected jets of liquid from interfering.

In some examples, said nozzle heads are arranged circularly across said rolling stock.

Other geometries may likewise be used, depending on the type and shape of the rolling stock.

For instance, said nozzle heads may be arranged in several different rows, wherein the different rows may be formed at an angle with respect to one another. In case the rolling stock comprise a bar or bloom, different rows of nozzle heads may be arranged to descale different side phases of the rolling stock.

In case the rolling stock comprises a rod or tube with a circular cross-section, said nozzle heads may be arranged in a star configuration.

Neighboring nozzle heads may be counter-propagating.

The features of the nozzle head, including the number of nozzles at varying distances from said axis of rotation, their respective outward inclination angles and circumferential inclination angles may vary among said plurality of nozzle head, in particular depending on a position of said nozzle heads in said row across said width of said rolling stock.

For instance, nozzle heads at the boundary or edge of the rolling stock may comprise a smaller number of nozzles than nozzle heads in the center, in particular a smaller number of nozzle along the outermost circumference of the respective nozzle head.

In an example, said device comprises a first nozzle head and a second nozzle head, in particular arranged in a row across a width of said rolling stock, wherein said first nozzle head and said second nozzle head are nozzle heads with some or all of the features described above, wherein said first nozzle head is mounted for rotation about a first axis of rotation relative to a surface of said rolling stock, wherein said first nozzle head comprises a first plurality of nozzles adapted to spray said liquid on said rolling stock, wherein said first plurality of nozzles comprises a first group of at least one nozzle positioned at a first radius, and a second group of at least one nozzle positioned at a second radius, wherein said second radius is smaller than said first radius.

Similarly, said second nozzle head may be mounted for rotation about a second axis of rotation relative to a surface of said rolling stock, wherein said second nozzle head comprises a second plurality of nozzles adapted to spray said liquid on said rolling stock.

Said second plurality of nozzles comprises a first group of at least one nozzle positioned at a first radius, and a second group of at least one nozzle positioned at a second radius, wherein said second radius is smaller than said first radius.

Said first nozzle head may be positioned closer to a boundary or an edge of said rolling stock than said second nozzle head, wherein said first group of nozzles of said first nozzle head comprises fewer nozzles than said first group of nozzles of said second nozzle head, and/or wherein said first group of nozzles of said first nozzle head comprises nozzles of smaller orifice size than said first group of nozzles of said second nozzle head.

A surface area of said rolling stock that said first nozzle head needs to descale in the vicinity of said boundary or edge of said rolling stock may be smaller than the surface area to be descaled by a nozzle head towards the center of the rolling stock. By adapting the size of nozzles or their numbers accordingly, a more homogeneous descaling can be achieved, and a waste of descaling liquid or other resources can be avoided.

The invention further relates to a method for descaling rolling stock, comprising the steps of rotating a nozzle head about an axis of rotation relative to a surface of said rolling stock, said nozzle head comprising a plurality of nozzles, and spraying a pressurized liquid on said rolling stock from said nozzles, wherein said nozzles are positioned at different radial distances from said axis of rotation.

Said method may further comprise a step of moving said rolling stock and said nozzle head relative to one another.

Said nozzle head may be a nozzle head with some or all of the features described above.

Said rolling stock may be a heated or non-heated stock of metal, in particular a stock of a non-ferrous metal.

In an embodiment, said method further comprises a step of supplying said liquid to said nozzles.

Said liquid may be any liquid suitable for descaling. In an embodiment, said liquid comprises water, or is water.

Said plurality of nozzles may comprise at least a first nozzle positioned at a first radial distance from said axis of rotation, and a second nozzle positioned at a second radial distance from said axis of rotation, wherein said second radial distance is smaller than said first radial distance, and said method comprises a step of spraying a different amount of liquid from said second nozzle than from said first nozzle, in particular a different amount of liquid per rotation of said nozzle head.

By varying the amount of liquid sprayed per rotation with a distance from said axis of rotation, a more homogeneous descaling and a more efficient use of descaling liquid can be achieved.

Nozzles at a smaller radial distance may sweep across a smaller area of said surface of said rolling stock, and hence may require less liquid, or at liquid at lower pressure.

In an embodiment, the method comprises a step of spraying a smaller amount of liquid from said second nozzle than from said first nozzle, in particular a smaller amount of liquid per rotation of said nozzle head.

The invention further relates to a computer program or to a computer program product comprising computer-readable instructions, wherein said instructions, when read on said computer, are adapted to implement on a device for descaling rolling stock functionally connected to said computer a method with some or all of the features described above.

In some examples, the computer program or computer program product may comprise instructions for registering operation parameters such as flow, pressure, rotation speed, distance between the stock and the nozzles of the nozzle head, and/or nozzle spray angle. The computer program or computer program product may be adapted to compute and/or display the impact on the surface of the rolling stock based on these parameters.

BRIEF DESCRIPTION OF THE FIGURES

The features and numerous advantages of the device and method for descaling rolling stock will become best apparent from a detailed description of embodiments with reference to the drawings, in which.

DETAILED DESCRIPTION OF EMBODIMENTS

Embodiments of the invention will now be described for the example of the descaling of a hot rolled stock of thin steel by spraying it with water under high pressure. However, the present invention is versatile, and can be applied for the descaling of a large variety of materials, including the hot or cold descaling of ferrous or non-ferrous metals.

Figure 2:
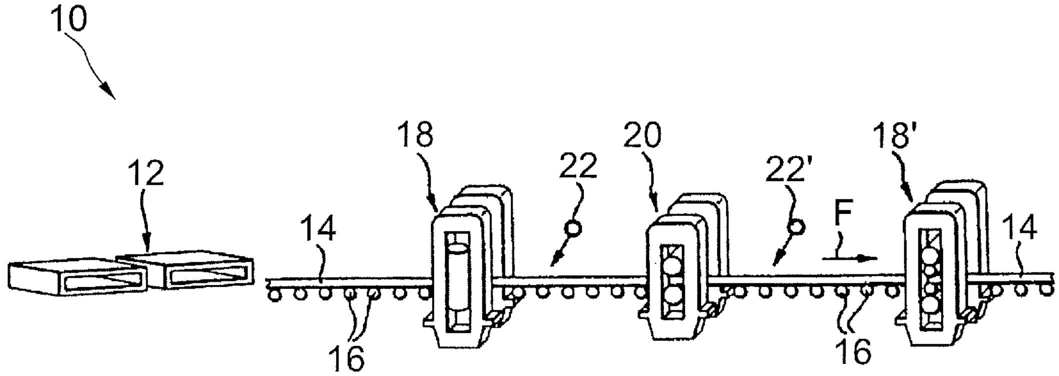
FIG. 2 is a schematic view of a descaling apparatus in which a device and method according to the present invention may be employed.

FIG. 2 is a schematic illustration of a rolling mill 10 for producing a wide steel strip. The steel is annealed in an annealing furnace 12 and enters a roughing mill section as a rolled stock 14 which is transported along the direction F (indicated by an arrow) by means of a roller train comprising driven rollers 16.

The rolling mill 10 comprises a plurality of roughing mills along the path of the rolling stock 14. FIG. 2 shows two vertical roughing mills 18, 18' sandwiching a horizontal roughing mill 20 along the direction of travel F of the rolling stock 14. However, this is merely an example, and in practical applications the rolling mill 10 may comprise a larger number of vertical and horizontal roughing mills and/or finishing mills to shape the rolling stock 14.

Figure 1:
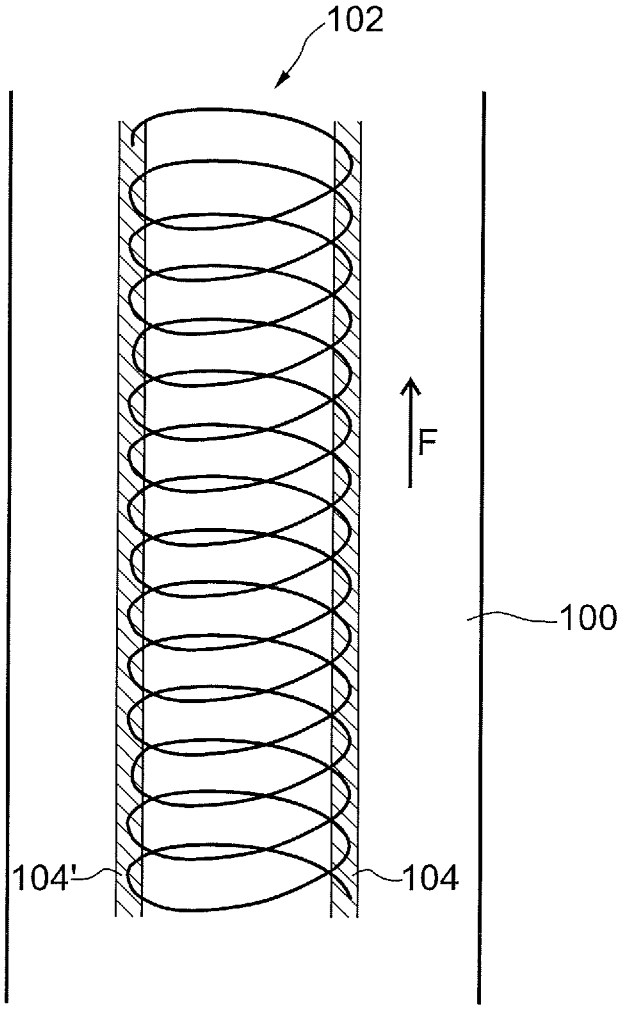
FIG. 1 (prior art)
FIG. 1 is a top plan view of a spray pattern according to the state of the art.

As can be further taken from FIG. 1, two descaling devices 22, 22' are positioned in between the roughing mills 18, 20 and 20, 18, respectively. These descaling devices 22, 22' are adapted to spray water under high pressure on all four sides of the rolling stock 14 so as to remove scale layers from the lower and upper surfaces and the side surfaces of the rolling stock 14. For instance, for a rolling stock 14 of a width of 900 mm and moving at a velocity of approximately 1 meters per second in the direction of arrow F, the descaling devices 22, 22' may operate at a pressure of approximately 1000 to 1200 bar and a flow rate of approximately 300 to 6,000 liters of water per minute each. The descaling of rounds, bars, pipes (inside and outside), forging blocks and other stock may employ similar parameters.

Figure 3:
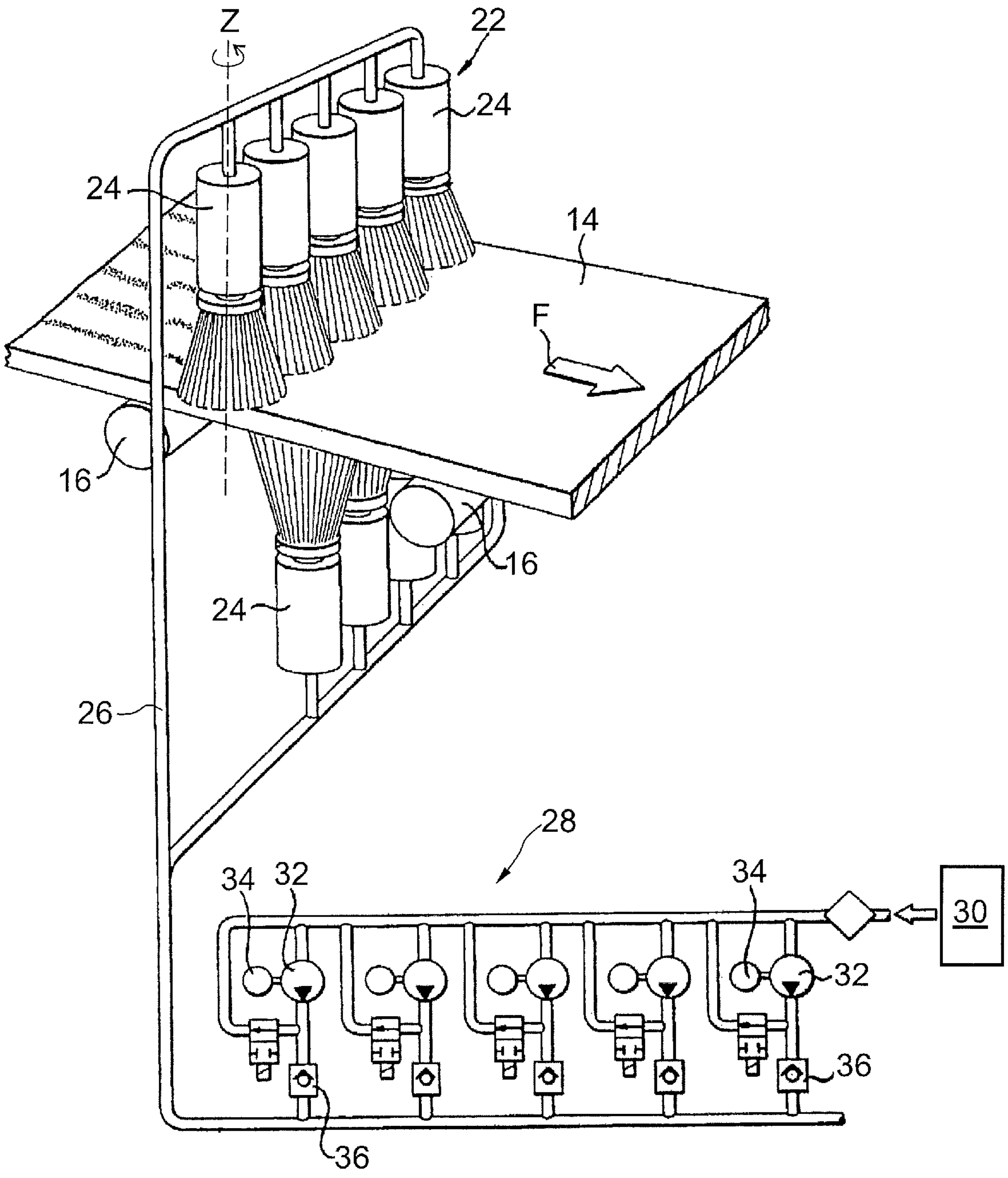
FIG. 3 is a schematic perspective view of a descaling device according to an embodiment of the invention.

FIG. 3 illustrates the set-up and design of the descaling device 22 in additional detail. The descaling device 22' can be largely identical.

The descaling device 22 comprises a plurality of nozzle heads 24 arranged in a linear array across the width of the rolling stock 14. FIG. 3 shows an array of five nozzle heads 24 on a upper side of the rolling stock 14, and four nozzle heads 24 at a lower side thereof. However, the number of nozzle heads 24 in any given descaling device 22 may vary depending on the size and width and shape of the rolling stock 14, its material composition and the operating parameters. In some examples, the descaling device 22 may spray on all four sides of the rolling stock 14, i.e., on the upper and lower surface sides as well as on the side surfaces of the rolling stock 14.

Each of the nozzle heads 24 is mounted to rotate around a central axis of rotation Z. For ease of presentation, only one axis Z is depicted in FIG. 3. However, each of the nozzle heads 24 similarly have their own axis of rotation, generally all in parallel, and are driven to rotate about their respective axis of rotation Z by means of a drive unit. The drive unit is not shown in FIG. 3 for ease of presentation, but will be explained below with reference to FIG. 4. The drive unit may comprise a hydraulic, pneumatic or electric drive motor. Each of the nozzle heads 24 may be provided with their own drive unit. Alternatively, a single integrated drive unit can be employed for a plurality of nozzle heads 24.

In some examples, the drive unit may comprise an electric motor adapted to rotate the nozzle heads 24 relative to the surface of the rolling stock 14 at a number of revolutions of from 200 to 1,200 rpm.

As can be further taken from FIG. 3, each of the nozzle heads 24 are connected via tubing 26 to a pressure generating supply unit 28 that is adapted to supply the nozzle heads 24 with a liquid to be sprayed on the rolling stock 14. For instance, the supply unit 28 may receive the liquid from a liquid reservoir 30 and may comprise a plurality of centrifugal pumps or displacement pumps 32 driven by respective motors 34 and adapted to supply pressurized liquid to said nozzle heads 24 via check valves 36 and the tubing 26.

Figure 4:
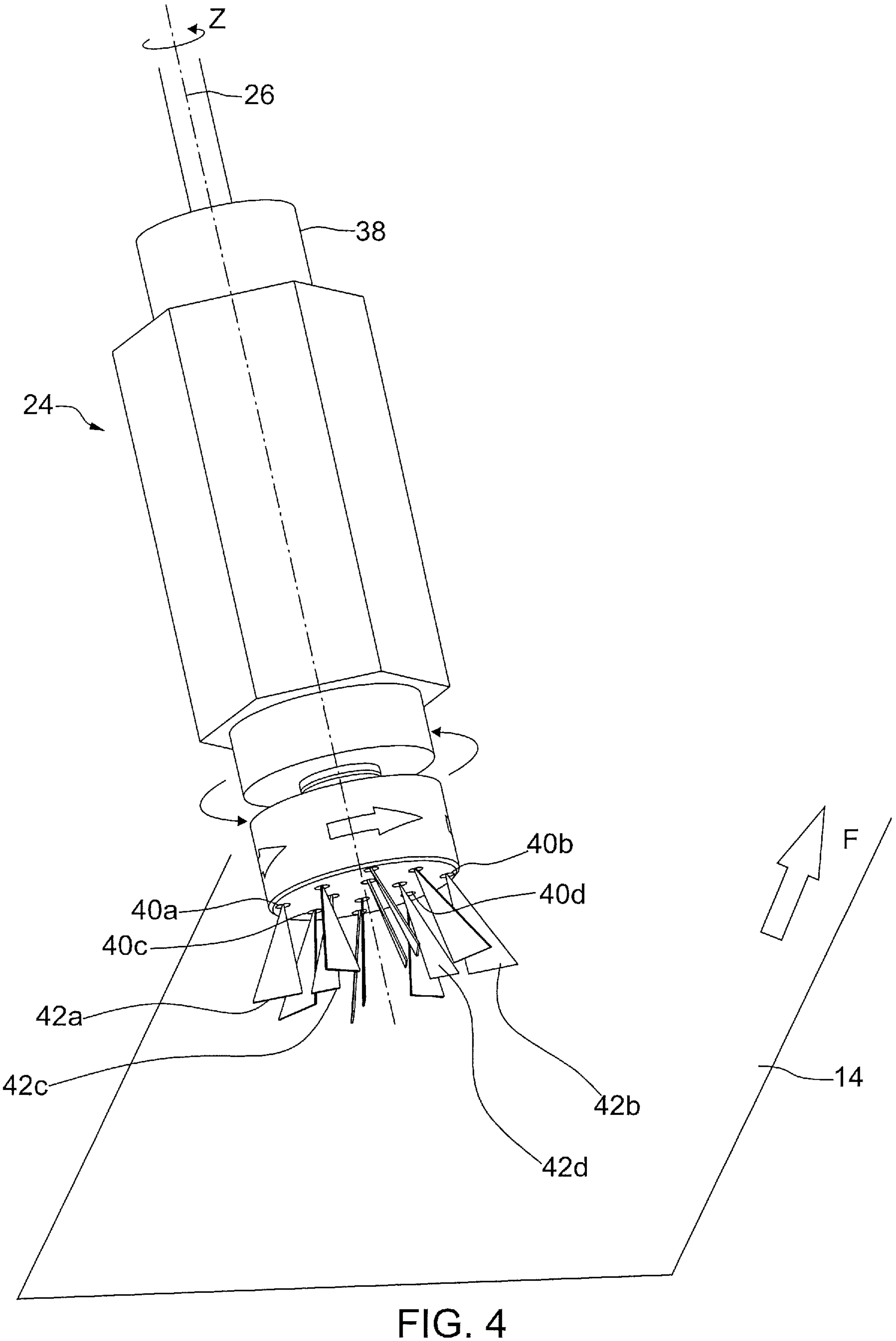
FIG. 4 is a schematic perspective view of a nozzle head with nozzles at different radial distances according to an embodiment of the invention.

FIG. 4 is a schematic perspective illustration of a nozzle head 24 in greater detail.

As can be taken from FIG. 4, the nozzle head 24 is generally cylindrical in shape, and is mounted rotatably relative to the tubing 26 and surface of the rolling stock 14 about its central cylindrical axis Z. FIG. 4 also shows a drive unit 38, such as an electrical motor or hydraulically motor or pneumatic motor that drives the nozzle head 24 to rotate about the axis of rotation Z.

As can be further taken from FIG. 4, the nozzle head 24 comprises a plurality of nozzles mounted at a lower side surface of the nozzle head 24 and adapted to rotate with the nozzle head 24 and to spray the liquid provided through the tubing 26 on the surface of the rolling stock 14. Some of these nozzles are indicated by reference numerals 40*e* to 40*d*, wherein the nozzles 40*a* and 40*b* are positioned at a first radial distance from the cylindrical axis Z, and the nozzles 40*c* and 40*d* are located at a second radial distance from the cylindrical axis Z that is smaller than the first radial distance. FIG. 4 also illustrates the corresponding spray patterns 42*a* to 42*d* of the respective nozzles 40*a* to 40*d* on the surface of the rolling stock 14.

Some or all of the nozzles 40*a* to 40*d* can be tilted slightly outwardly, for instance at an outward inclination angle in the range of approximately 10°.

Moreover, each of the nozzles 40*a* to 40*d* may be inclined in a forward circumferential direction, i.e. in a direction of rotation of the spray head 24. For instance, a circumferential inclination angle of the nozzles may be in the range of approximately 20°.

Once the nozzle head 24 rotates and the nozzles 40*a* to 40*d* spray the liquid under the outward inclination angle and forward inclination angle onto the surface of the rolling stock 14, scale layers that may form on the surface of the rolling stock 14 during the milling, or in between milling steps, are efficiently and thoroughly removed.

The design and inner workings of the nozzle head 14 may be generally similar to those described in U.S. Pat. No. 5,502,881 and US 2007/0277358 A1, and full reference is made to these documents.

However, unlike in the prior art, the nozzles are not all arranged at an outmost circumference of the nozzle head 24. Rather, the nozzles are positioned at different radial distances from the axis of rotation Z, as will now be described in further detail with reference to FIG. 5.

Figure 5:
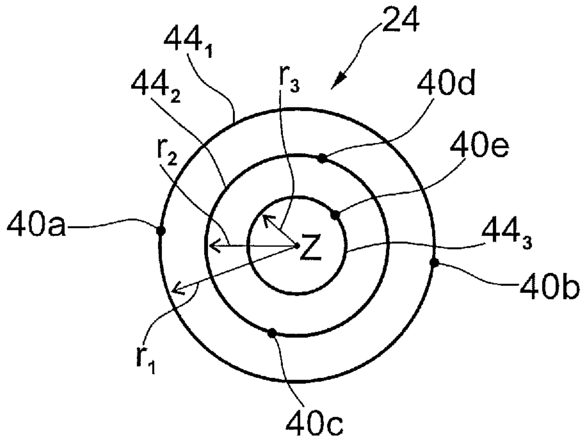
FIG. 5 is a schematic lower plan view of a nozzle head that illustrates the position of nozzles on different circles according to an embodiment of the invention.

FIG. 5 is a schematic lower plan view of a nozzle head 24 according to an embodiment and illustrates how a plurality of nozzles 40*a* to 40*e* are positioned on the nozzle head 24.

As can be taken from FIG. 5, the nozzles 40*a* to 40*e* of the nozzle head 24 can be arranged along three concentric circles $\mathbf{44}_1$, $\mathbf{44}_2$, $\mathbf{44}_3$ with different radii $r_1$, $r_2$, $r_3$, wherein the center of the circles $\mathbf{44}_1$, $\mathbf{44}_2$, $\mathbf{44}_3$ corresponds to the axis of rotation Z. The radii $r_1$, $r_2$, $r_3$ hence represent the radial distance of the respective nozzles 40*a* to 40*e* arranged on the respective circles $\mathbf{44}_1$, $\mathbf{44}_2$, $\mathbf{44}_3$. In the configuration of FIG. 5, the second (middle) circle $\mathbf{44}_2$ is smaller than the first (outmost) circle $\mathbf{44}_1$, with a radius $r_2=0.7\times r_1$. The third (innermost) circle $\mathbf{44}_3$ is the smallest, with a radius $r_3=0.7\times r_2$.

In general, each of the respective circles $\mathbf{44}_1$, $\mathbf{44}_2$, $\mathbf{44}_3$ may comprise any number of nozzles. In some examples, any of the circles $\mathbf{44}_1$, $\mathbf{44}_2$, $\mathbf{44}_3$ comprises at least two nozzles.

In some examples, the number of nozzles per circle $\mathbf{44}_1$, $\mathbf{44}_2$, $\mathbf{44}_3$ may be at most six.

In the example of FIG. 5, two nozzles 40*a*, 40*b* are positioned diametrically opposite on the outermost circle $\mathbf{44}_1$ at a radial distance $r_1$ from the axis of rotation Z. Two nozzles 40*c*, 40*d* are positioned diametrically opposite on the middle circle $\mathbf{44}_2$ at a radial distance $r_2$ from the axis of rotation Z. In the configuration of FIG. 5, the pair of nozzles 40*c*, 40*d* are rotated with respect to the pair of nozzles 40*a*, 40*b* by 90° in a circumferential direction (direction of rotation). A single nozzle 40*e* is positioned on the innermost circle $\mathbf{44}_3$ at a radial distance $r_3$ from the axis of rotation Z. In other examples, the innermost circle $\mathbf{44}_3$ comprises two nozzles that are positioned diametrically opposite, similarly to the outermost circle $\mathbf{44}_1$ and the middle circle $\mathbf{44}_2$.

A radial distance R between nozzles on different radii may be chosen depending on the height H of the nozzles above the rolling stock 14 and depending on the jet opening angle α of the nozzles so that the spray patterns of the neighboring nozzles touch or slightly overlap when impinging on the stock 14.

Figure 6:
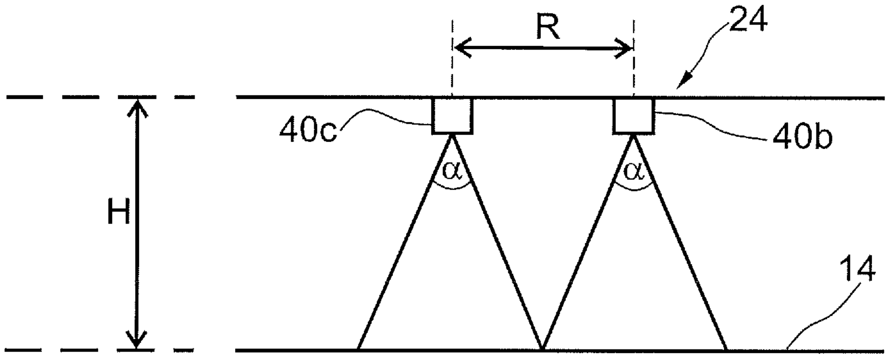
FIG. 6 is a schematic illustration of the relation between the radial distance and the jet opening angle of neighboring nozzles according to an embodiment.

A corresponding configuration for neighboring nozzles 40*b*, 40*c* is shown in FIG. 6, where $R=r_1-r_2$. Similar considerations apply in case $R=r_2-r_3$. Based on geometric considerations, we have $$\tan\frac{\alpha}{2} = \frac{R}{2\times H}$$

As can be taken from this relation, the jet opening angle α, the radial distance R between neighboring nozzles and the height H of the nozzles above the surface of the rolling stock 14 may be interdependent.

Figure 7:
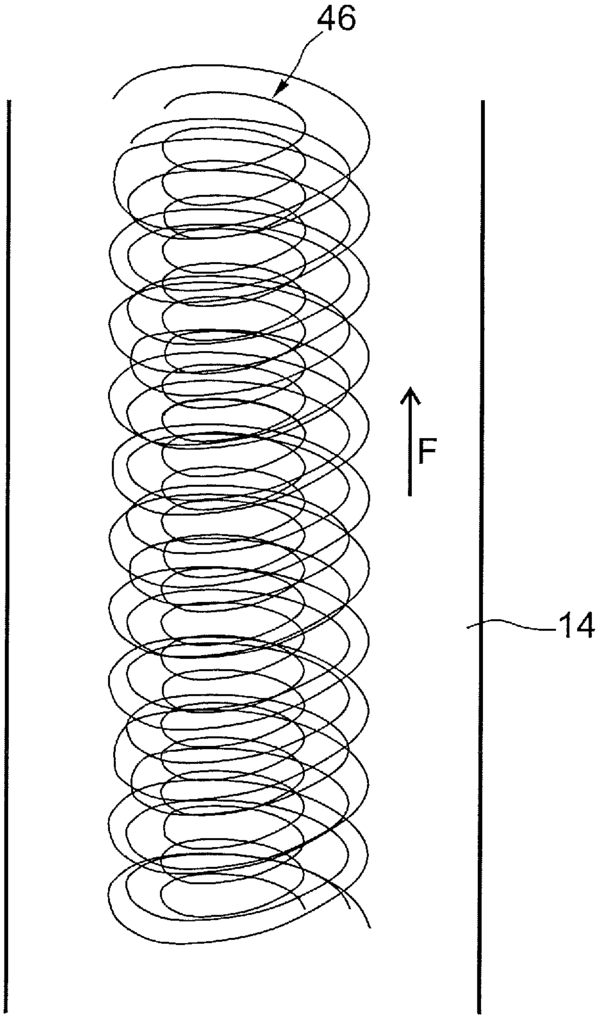
FIG. 7 schematically illustrates a spray pattern that can be obtained with a nozzle head according to an embodiment of the invention.

The distribution of nozzles 40*a* to 40*e* at varying radial distances from the axis of rotation Z leads to a more homogeneous, more uniform spray pattern across the surface of the rolling stock 14. A corresponding spray pattern 46 is shown schematically in FIG. 7. As can be taken from a comparison of FIG. 7 with FIG. 1, the nozzle head 24 according to the invention helps to avoid the formation of strips 104, 104' in the spray pattern. As a result, the surface of the rolling stock 14 may be descaled more thoroughly, and more uniformly. Moreover, a given level of desired descaling can be achieved with a smaller amount of liquid, and hence at lower cost.

The examples of FIGS. 4 and 5 show five nozzles 40*a* to 40*e* arranged on three different circles $\mathbf{44}_1$, $\mathbf{44}_2$, $\mathbf{44}_3$. However, this is just an example, and a larger or smaller number of nozzles arranged on a larger or smaller number of circles may be employed.

Moreover, the nozzles 40*a* to 40*e* need not necessarily be arranged pairwise or in circles, but could be distributed differently at different radial distances from the axis of rotation Z on the lower side of the nozzle head 24.

The outward inclination angle and circumferential inclination angle of the nozzles 40*a* to 40*e* may be chosen identically or differently for each of the nozzles 40*a* to 40*e*.

Similarly, an orifice size, such as an orifice diameter, of the nozzles 40*a* to 40*e* may vary, depending on a distance of the respective nozzle from the axis of rotation Z. For instance, the outermost nozzles 40*a*, 40*b* on the circle $\mathbf{44}_1$ may have orifices of larger size than the innermost nozzle 40*e* on the circle $\mathbf{44}_3$, and hence may spray more liquid per rotation, in accordance with the larger surface area of the rolling stock 14 across which they sweep.

In case several nozzle heads 24 are arranged in a row or otherwise across a width of the rolling stock 14, as illustrated in FIG. 3, all the nozzle heads 24 may be identical, and may correspond to the nozzle head 24 described above with reference to FIGS. 4 and 5.

However, in other embodiments, the configuration and position of the nozzles may differ depending on the position of the nozzle head 24 in the descaling device 22. For instance, a nozzle head at the edge or boundary of the rolling stock 14 could have a smaller number of nozzles, or nozzles with a smaller orifice size on the outermost circle. In an embodiment, such a nozzle head could correspond to the nozzle head shown in FIG. 5, but with the nozzle 40*b* removed.

In general, the number of nozzle heads, the number of nozzles on the different radii of the nozzle heads, as well as the distance between neighboring nozzle heads, the height H of the nozzles above the surface of the rolling stock and the fluid pressure can be chosen depending on the type and surface properties of the rolling stock, so to achieve a desired impingement.

Figure 8:
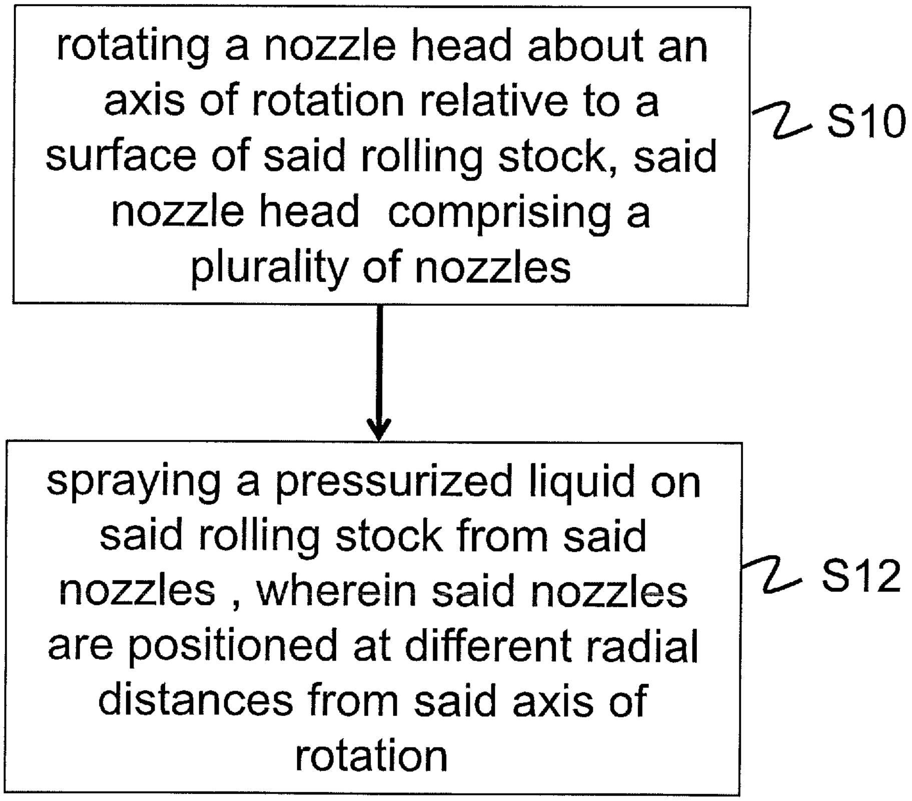
FIG. 8 is a flow diagram that illustrates a method according to an embodiment of the invention.

A method according to an embodiment of the invention is schematically illustrated in the flow diagram of FIG. 8.

In a first step S10, the nozzle head 24 is rotated about an axis of rotation Z relative to a surface of the rolling stock 14. Said nozzle head 24 comprises a plurality of nozzles 40*a* to 40*e*.

In a second step S12, a pressurized liquid, such as water, is sprayed on said surface of said rolling stock 14 from said nozzles 40*a* to 40*e*, wherein said nozzles 40*a* to 40*e* are positioned at different radial distances $r_1$, $r_2$, $r_3$ from said axis of rotation Z.

The embodiments described above and the Figures merely serve to illustrate the invention, but should not be construed to imply any limitation. The scope of the invention is determined by the appended claims.

REFERENCE SIGNS

10 rolling mill
12 annealing furnace
14 rolling stock
16 roller train
18, 18' vertical roughing mills
20 horizontal roughing mill
22, 22' descaling devices
24 nozzle heads
26 tubing
28 supply unit
30 liquid reservoir
32 centrifugal pumps
34 motors of centrifugal pumps
36 check valves
38 drive unit
40*a*-40*e* nozzles of nozzle head 24
42*a*-42*d* spray patterns of nozzles 40*a*-40*d*
$44_1$, $44_2$, $44_3$ circles of nozzle head 24
46 spray pattern
100 rolling stock
102 spiral spray pattern
104, 104' strips in spiral spray pattern 102

The invention claimed is:

1. A nozzle head for descaling rolling stock moving relative to said nozzle head;

wherein said nozzle head is adapted to be mounted for rotation about an axis of rotation relative to a surface of said rolling stock;

wherein said nozzle head comprises a plurality of nozzles adapted to spray a liquid on said rolling stock; and wherein said nozzle head comprises a first group of at least three of said nozzles positioned at a first radial distance from said axis of rotation, and a second group of at least two of said nozzles positioned at a second radial distance from said axis of rotation, wherein said second radial distance is smaller than said first radial distance; and wherein a number of nozzles in said second group of said nozzles is smaller than a number of nozzles in said first group of said nozzles.

2. The nozzle head according to claim 1, wherein said second radial distance is at most 0.9 times said first radial distance, and in particular at most 0.8 times said first radial distance.

3. The nozzle head according to claim 1, wherein said nozzles are arranged along circles or ellipses with different radii.

4. The nozzle head according to claim 1, wherein said nozzles are radially inclined outwardly.

5. The nozzle head according to claim 1, further comprising at least a first nozzle positioned at a first radial distance from said axis of rotation, said first nozzle being radially inclined outwardly at a first outward inclination angle, and a second nozzle positioned at a second radial distance from said axis of rotation, said second nozzle being radially inclined outwardly at a second outward inclination angle, wherein said second radial distance is smaller than said first radial distance and wherein said second outward inclination angle is different from said first outward inclination angle.

6. The nozzle head according to claim 1, wherein said nozzles are inclined in a circumferential direction of said nozzle head, in particular in a direction of rotation of said nozzle head or against a direction of rotation of said nozzle head.

7. The nozzle head according to claim 1, further comprising at least a first nozzle positioned at a first radial distance from said axis of rotation, said first nozzle being inclined in a circumferential direction at a first circumferential inclination angle, and a second nozzle positioned at a second radial distance from said axis of rotation, said second nozzle being inclined in a circumferential direction at a second circumferential inclination angle, wherein said second radial distance is smaller than said first radial distance and wherein said second circumferential inclination angle is different from said first circumferential inclination angle.

8. The nozzle head according to claim 1, further comprising at least a first nozzle positioned at a first radial distance from said axis of rotation, said first nozzle having a first orifice size, and a second nozzle positioned at a second radial distance from said axis of rotation, said second nozzle having a second orifice size, wherein said second radial distance is smaller than said first radial distance, and wherein said second orifice size is different from said first orifice size, in particular smaller or larger than said first orifice size.

9. A device for descaling rolling stock, the device comprising a plurality of nozzle heads, each of the plurality of nozzle heads being adapted to be mounted for rotation about an axis of rotation relative to a surface of said rolling stock;

wherein each said nozzle head comprises a plurality of nozzles adapted to spray a liquid on said rolling stock; and wherein each said nozzle head comprises a first group of at least three of said nozzles positioned at a first radial distance from said axis of rotation, and a second group of at least two of said nozzles positioned at a second radial distance from said axis of rotation, wherein said second radial distance is smaller than said first radial distance;

wherein a number of nozzles in said second group of said nozzles is smaller than a number of nozzles in said first group of said nozzles; and wherein the plurality of nozzle heads is arranged vertically and/or horizontally across a width of said rolling stock, and/or arranged circularly across said rolling stock.

10. The device according to claim 9, wherein the plurality of nozzle heads includes a first nozzle head and a second nozzle head, in particular arranged in a row across a width of said rolling stock;

wherein said first nozzle head is mounted for rotation about a first axis of rotation relative to a surface of said rolling stock;

wherein said first nozzle head comprises a first plurality of nozzles adapted to spray said liquid on said rolling stock;

wherein said first plurality of nozzles comprises a first group of at least three nozzles positioned at a first radius, and a second group of at least two nozzles positioned at a second radius, wherein a number of nozzles in said second group of said nozzles is smaller than a number of nozzles in said first group of said nozzles;

wherein said second radius is smaller than said first radius;

wherein said second nozzle head is mounted for rotation about a second axis of rotation relative to a surface of said rolling stock;

wherein said second nozzle head comprises a second plurality of nozzles adapted to spray said liquid on said rolling stock;

wherein said second plurality of nozzles comprises a first group of at least three nozzles positioned at a first radius, and a second group of at least two nozzles positioned at a second radius, wherein a number of nozzles in said second group of said nozzles is smaller than a number of nozzles in said first group of said nozzles;

wherein said second radius is smaller than said first radius;

wherein said first nozzle head is positioned closer to a boundary or an edge of said rolling stock than said second nozzle head;

wherein said first group of nozzles of said first nozzle head comprises fewer nozzles than said first group of nozzles of said second nozzle head; and/or wherein said first group of nozzles of said first nozzle head comprises nozzles of smaller orifice size than said first group of nozzles of said second nozzle head.

11. A method for descaling rolling stock, comprising:

rotating a nozzle head about an axis of rotation relative to a surface of said rolling stock, said nozzle head comprising a plurality of nozzles; and spraying a pressurized liquid on said rolling stock from said nozzles;

wherein said nozzle head comprises a first group of at least three of said nozzles positioned at a first radial distance from said axis of rotation, and a second group of at least two of said nozzles positioned at a second radial distance from said axis of rotation, wherein said second radial distance is smaller than said first radial distance; and wherein a number of nozzles in said second group of said nozzles is smaller than a number of nozzles in said first group of said nozzles.

12. The method according to claim 11, wherein said rolling stock is a heated or non-heated stock of metal, in particular a non-ferrous metal.

13. The method according to claim 11, wherein said plurality of nozzles comprises at least a first nozzle positioned at a first radial distance from said axis of rotation, and a second nozzle positioned at a second radial distance from said axis of rotation, wherein said second radial distance is smaller than said first radial distance, and said method comprises a step of spraying a different amount of liquid from said second nozzle than from said first nozzle, in particular a different amount of liquid per rotation of said nozzle head.

14. A computer program comprising computer-readable instructions, wherein said instructions, when read on said computer, are adapted to implement on a device for descaling rolling stock functionally connected to said computer a method according to claim 11.

* * * * *